(12) United States Patent
Vercruysse et al.

(10) Patent No.: US 12,019,268 B2
(45) Date of Patent: Jun. 25, 2024

(54) SERPENTINE OPTICAL PHASED ARRAY WITH DISPERSION MATCHED WAVEGUIDES

(71) Applicant: The Board of Trustees of the Leland Stanford Junior University, Stanford, CA (US)

(72) Inventors: Dries J. F. Vercruysse, Palo Alto, CA (US); Jelena Vuckovic, Palo Alto, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 37 days.

(21) Appl. No.: 18/015,930

(22) PCT Filed: Jul. 26, 2021

(86) PCT No.: PCT/US2021/043113
§ 371 (c)(1),
(2) Date: Jan. 12, 2023

(87) PCT Pub. No.: WO2022/026352
PCT Pub. Date: Feb. 3, 2022

(65) Prior Publication Data
US 2023/0258861 A1 Aug. 17, 2023

Related U.S. Application Data

(60) Provisional application No. 63/058,728, filed on Jul. 30, 2020.

(51) Int. Cl.
*G02B 6/12* (2006.01)
*G02F 1/29* (2006.01)

(52) U.S. Cl.
CPC ...... *G02B 6/12011* (2013.01); *G02B 6/12016* (2013.01); *G02F 1/292* (2013.01)

(58) Field of Classification Search
CPC ............ G02B 6/12011; G02B 6/12016; G02B 2006/12107; G02F 1/292; G01S 7/4817
See application file for complete search history.

(56) References Cited

U.S. PATENT DOCUMENTS 11,782,139 B2* 10/2023 Wagner ................. G01S 7/4818
356/4.01

OTHER PUBLICATIONS

Vercruysse et al., Inverse-Designed Photonic Crystal Devices for Optical Beam Steering, arXiv:2102.00681 [physics.optics], Mon, Feb. 1, 2021.

(Continued)

*Primary Examiner* — John Bedtelyon
(74) *Attorney, Agent, or Firm* — LUMEN PATENT FIRM

(57) ABSTRACT

A dispersion-engineered 2D optical phased array device includes optical slow light waveguides [202, 208, 218] arranged parallel to each other; waveguide bends [206, 216] optically coupling ends of adjacent waveguides of the optical slow light waveguides to form a serpentine optical configuration; wherein the optical slow light waveguides comprise first waveguides of a first waveguide type and second waveguides of a second waveguide type, wherein the first waveguides and the second waveguides are arranged adjacent to each other and alternate with each other; wherein the optical slow light waveguides comprise phased array sections forming a phased array [214], wherein first waveguides and second waveguides have dispersion slopes of opposite sign and the same group index; wherein the optical slow light waveguides comprise slow light delay waveguide sections [210] that provide a delay between adjacent waveguides.

9 Claims, 9 Drawing Sheets

(56) References Cited

OTHER PUBLICATIONS

Dostart et al., Serpentine optical phased arrays for scalable integrated photonic LIDAR beam steering, arXiv:2002.06781 [physics.optics], Feb. 17, 2020.
Guo et al., Integrated Optical Phased Arrays for Beam Forming and Steering, Appl. Sci. 2021, 11(9), 4017. Apr. 28, 2021.
K.Van Acoleyen, W. Bogaerts, and R. Baets. Two-dimensional dispersive off-chip beam scanner fabricated on silicon-on-insulator. IEEE Photonics Technology Letters, 23(17):1270-1272, Sep. 2011.
Martijn J.R. Heck. Highly integrated optical phased arrays: Photonic in-tegrated circuits for optical beam shaping and beam steering. 6(1):93-107, 2017.

* cited by examiner

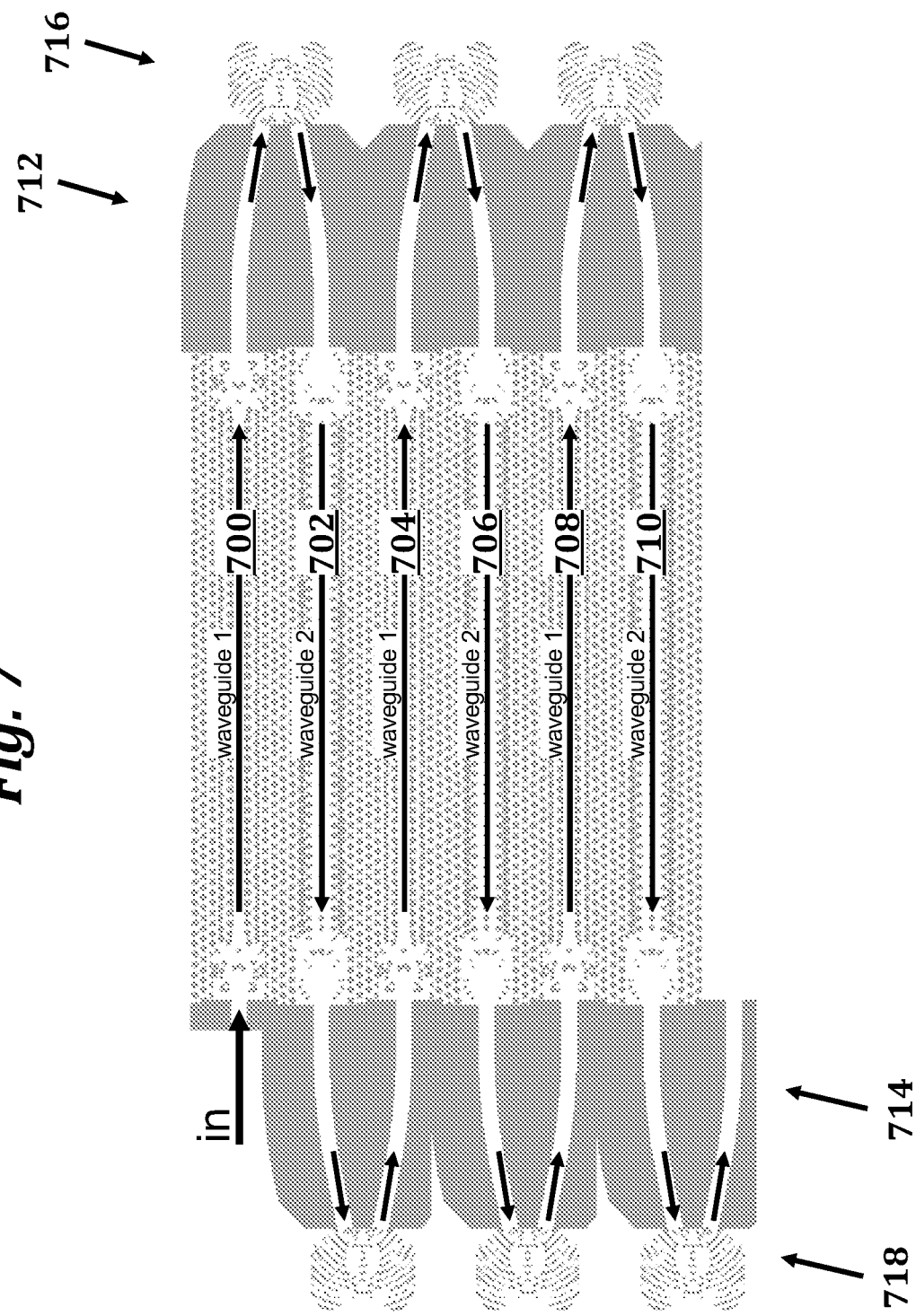

SERPENTINE OPTICAL PHASED ARRAY WITH DISPERSION MATCHED WAVEGUIDES

CROSS-REFERENCE TO RELATED APPLICATIONS

This application is a 371 of PCT application PCT/US2021/043113 filed Jul. 26, 2021. PCT application PCT/US2021/043113 claims the benefit of U.S. Provisional application 63/058,728 filed Jul. 30, 2020.

STATEMENT OF GOVERNMENT SPONSORED SUPPORT

This invention was made with Government support under contract 1741660 awarded by the National Science Foundation. The Government has certain rights in the invention.

FIELD OF THE INVENTION

The present invention relates generally to optical phased arrays. More specifically, it relates to solid state beam-steering using optical phased arrays.

BACKGROUND OF THE INVENTION

Optical beam-steering is a key feature of optical techniques such as light detection and ranging (LIDAR), projectors, and microscopy. Traditionally, these systems have used movable mirrors to steer beams. However, moving components are typically bulky, vibration-sensitive, and expensive. Recently there has been considerable interest in optical phased array (OPA) systems as a solid state beam-steering solution. OPAs make use of a grid of optical antennas that emit light with a specific phase relation so that the antennas produce a directed beam. By altering the phase relations, the beam direction can be altered, i.e., steered. FIG. 1A is a schematic diagram of a simple four-element 1D optical phased array. A laser 100 produces light that is split into four waveguides 102, 104, 106, 108. The four waveguides have four corresponding phase-shifting elements or tuners 110, 112, 114, 116 that induce a relative phase difference of $\Delta\phi$ between the light in adjacent waveguides. The optical signals in the waveguides are then transmitted from four optical emitters 118, 120, 122, 124 and coherently combine to produce a beam 126 in a direction that depends on the phase difference $\Delta\phi$. By controlling the phase difference, the beam can be steered over a range of angles.

In designing an OPA, two major challenges arise. First, if the separation between adjacent antenna emitters 130 is more than half the wavelength of the emitted light, then multiple beam lobes 132 will be produced, as shown in FIG. 1B. Multiple lobes are not necessarily problematic since an aperture can block unwanted side lobes. Such an aperture, however, limits the scanning range of the primary lobe. This problem can be avoided if the separation between antennas 134 is less than half the emitted wavelength, since in this case the OPA will radiate a single lobe 136, as shown in FIG. 1C. However, this leads to a second problem, because the size of the phase-shifting elements makes it difficult to reduce the spacing between the antennas.

One approach to solving this problem is to use wavelength-based steering instead of phase-shifting elements. By using the natural angular dispersion of grating couplers in a waveguide, changes in wavelength can be used to steer the beam in the longitudinal direction (i.e., in the direction of the waveguide), thereby eliminating the need for bulky phase shifters in the waveguide. Although this solves the problem for 1D OPAs, the problem remains for 2D OPAs, because phase shifters or delay lines are still needed to control the phase of light entering each waveguide in order to control steering in the transverse direction.

A 2D dispersion engineered 2D OPA is described in US20200379315, which is incorporated herein by reference. Multiple 1D waveguides are arranged parallel to each other, where each waveguide 140 is a 1D phased array with wavelength-based steering in the longitudinal direction, as shown in FIG. 1D. The 1D phased array lines are fed using splitter tree followed by phase shifting modulators 142 positioned at the start of each waveguide. The phase relation between the different waveguides results in steering of the beam in the transverse direction, defined by the angle $\Theta$, while the phase relation between emitters within each waveguide steers in the longitudinal direction, defined by the angle $\Psi$. The phase modulators, however, limit the minimum spacing between the waveguides, and thus limit the transverse steering capabilities.

Another 2D OPA architecture that uses wavelength based 2D steering is shown in FIG. 1E. It is composed of a collection of 1D OPAs 150, each using wavelength-based steering. The incoming light is split by a star coupler 152 that couples to a series of progressively longer waveguides 152, i.e., an arrayed waveguide grating. Relative phase differences between the signals fed into the 1D OPAs results from the difference in length (hence phase delay) of the waveguides 152. This design, however, has the disadvantage that the waveguides 154 take up considerable space. The total length of the delay elements scales with $0.5 \cdot L \cdot (N-1)^2$, where N is the number of waveguides, and L is the delay length. This is made worse for smaller bandwidth, because L will increase; and to decrease the antenna spacing, N will increase. This results in very large arrayed waveguide grating 154, much larger than the actual array 150.

A serpentine 2D OPA architecture, shown in FIG. 1F, avoids the arrayed waveguide grating space problem by routing the output 160 of each 1D OPA 166 to the input 162 of the adjacent 1D OPA via a waveguide 164 that passes between the two adjacent 1D OPAs. The phase delay between neighboring waveguides results from the optical signal traveling through a 1D OPA and the return waveguide before entering the next 1D OPA. The key to this serpentine 2D OPA concept is to steer with wavelength in both dimensions by using grating couplers in one dimension and a sequential folded serpentine delay line in the other. This allows the frequency of a single tunable laser to implement wavelength-based beam steering in both longitudinal and transverse directions, eliminating the need for phase-shifters entirely. This makes the delay footprint considerably smaller. However, the returning waveguide 164 passing between adjacent waveguides limits the minimum spacing between the 1D OPAs.

SUMMARY OF THE INVENTION

Embodiments of the present invention provide a wavelength based steering 2D OPA architecture, which can steer light in both longitudinal and transverse directions, providing reduced footprint, improved antenna density, and small operating bandwidth.

2D OPA embodiments of the present invention combine 1D OPAs in a serpentine arrangement, without interposed non-radiating return waveguides, to make a dense 2D OPA. The optical phased array uses slow light waveguides for slow wavelength-based steering in the longitudinal direction, and a serpentine architecture for fast steering in the transverse direction. The design uses two types of slow light waveguides having the same group index but opposite dispersion slopes. Unlike previous serpentine OPA architectures, where there is a non-radiating returning waveguide, this design uses a matched waveguide, so that light propagating in both directions radiates. By using two types of 1D OPAs that radiate with light moving in opposite directions, it achieves higher antenna density and thus a larger 2D scanning cone.

In one aspect, the invention provides a dispersion-engineered 2D optical phased array device comprising: optical slow light waveguides arranged parallel to each other; waveguide bends optically coupling ends of adjacent waveguides of the optical slow light waveguides to form a serpentine optical configuration; wherein the optical slow light waveguides comprise first waveguides of a first waveguide type and second waveguides of a second waveguide type, wherein the first waveguides and the second waveguides are arranged adjacent to each other and alternate with each other; wherein the optical slow light waveguides comprise phased array sections, wherein first waveguides and second waveguides have dispersion slopes of opposite sign and the same group index; wherein the optical slow light waveguides comprise slow light delay waveguide sections that provide a delay between adjacent waveguides.

In some embodiments, the first waveguides of the first waveguide type comprise the slow light delay waveguide sections, and the second waveguides of the second waveguide type comprise middle phased array waveguide sections that couple directly to waveguide bends. In some embodiments, the second waveguides of the second waveguide type comprise the slow light delay waveguide sections, and the first waveguides of the first waveguide type comprise middle phased array waveguide sections that couple directly to waveguide bends. In some embodiments, the first waveguides of the first waveguide type and the second waveguides of the second waveguide type comprise the slow light delay waveguide sections.

In some embodiments, the slow light delay waveguide sections and the first phase array sections have equal dispersion slopes. In some embodiments, the slow light delay waveguide sections and the second phase array sections have equal dispersion slopes. In some embodiments, slow light delay waveguide sections of the first waveguides have dispersion slopes equal to dispersion slopes of the first phase array sections. In some embodiments, slow light delay waveguide sections of the second waveguides have dispersion slopes equal to dispersion slopes of the second phase array sections. In some embodiments, slow light delay waveguide sections provide equal phase delays between phased array sections of adjacent phased array sections.

BRIEF DESCRIPTION OF THE DRAWINGS

FIG. 7 shows a dispersion-engineered design of a serpentine 2D OPA, according to one embodiment of the invention.

DETAILED DESCRIPTION

Embodiments of the invention provide an OPA architecture that steers in two directions by sweeping the wavelength, without any phase-shifting elements. The architecture can work in a small bandwidth and has a high antenna density, assuring a large sweep angle. The architecture has a serpentine structure based on two distinct types of group-index matched slow light waveguides. Slow light waveguides accommodate slow wavelength-based steering in the longitudinal direction, i.e., the direction along the waveguide. To accommodate fast steering in the transverse direction, i.e., orthogonal to the waveguides, a serpentine architecture is used. The design includes two distinct types of slow light waveguides, which have the same group index but an opposite dispersion slope. Unlike previous serpentine OPA architectures, which include a returning waveguide that does not radiate, the present design uses a matched waveguide, which radiates as well. By eliminating the non-radiating returning waveguide, the design achieves higher antenna density and, as a result, a larger 2D scanning cone.

General Architecture

Figure 2:
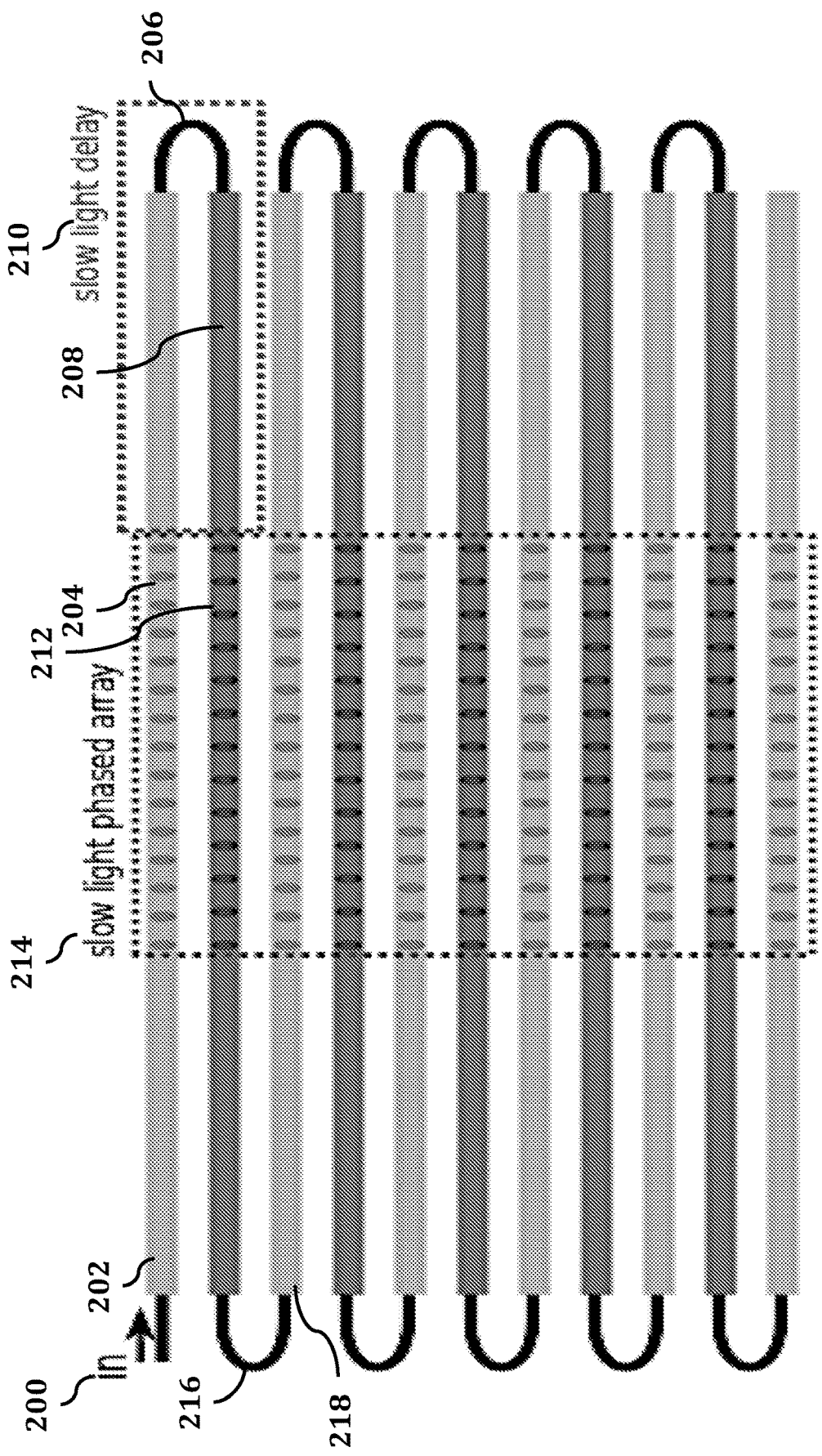
FIG. 2 shows a schematic of an OPA device with a serpentine architecture and waveguides radiating from all waveguides, according to one embodiment of the invention.

A schematic of an OPA device according to one embodiment of the invention is shown in FIG. 2. The OPA device is composed of a collection of dispersion-engineered slow light waveguides, joined by waveguide bends to form a serpentine structure. Light 200 enters the OPA by coupling into the left end of a first long slow light waveguide 202. A series of optical antenna structures 204 are positioned in a middle phased array section of the waveguide 202. A slow light waveguide is waveguide with an optical mode that has a low group velocity, $v_g$. The group velocity is determined by the slope in the dispersion relation, $d\omega/dk$. Commonly, people use the comparison with the speed of light as a measure, $c/v_g$, this is called the group index. A normal silicon waveguide has a group index of 3-5. A slow light waveguide has an index greater than 8. The waveguides in embodiments of the present invention preferably have a group index of 20-25.

The right end of the first waveguide 202 couples to a waveguide bend 206 that couples to the right end a second waveguide 208 positioned parallel to and adjacent to the first waveguide. The second waveguide 208 has the same group index as the first waveguide 202 but an opposite dispersion slope as the first waveguide. The right sections of the first and second waveguides, together with the waveguide bend 206 form a slow light delay 210 between middle sections of the first and second waveguides. Like the first waveguide, a series of antenna structures 212 are positioned in the middle section of the second waveguide 208. These middle sections, which contain optical antenna structures, form the first two rows of a slow light phased array 214. At the left end of the second waveguide 208, another waveguide bend 216 couples to a third waveguide 218 positioned parallel to and adjacent to the second waveguide. The left sections of the second and third waveguides, together with the waveguide bend 216 form a slow light delay between the second and third rows of antennas in the slow light phased array 214. The first and third waveguides 202 and 218 are of the same type, i.e., have the same group index and the same dispersion slope. The second waveguide 208 is a different type, i.e., has the same group index as the first and third waveguides, but the opposite dispersion slope as the first and third waveguides. The OPA device is composed of waveguides that have the same group index but alternate in their dispersion slopes, so that adjacent waveguides have the same group index but alternate dispersion slopes. The light propagates through adjacent waveguides in opposite directions, and light is emitted by antenna structures as it propagates in both directions. Thus, the rows of the slow light phased array can be positioned adjacent to each other, without any non-radiating return waveguide separating them.

Longitudinal Steering

Figure 1A:
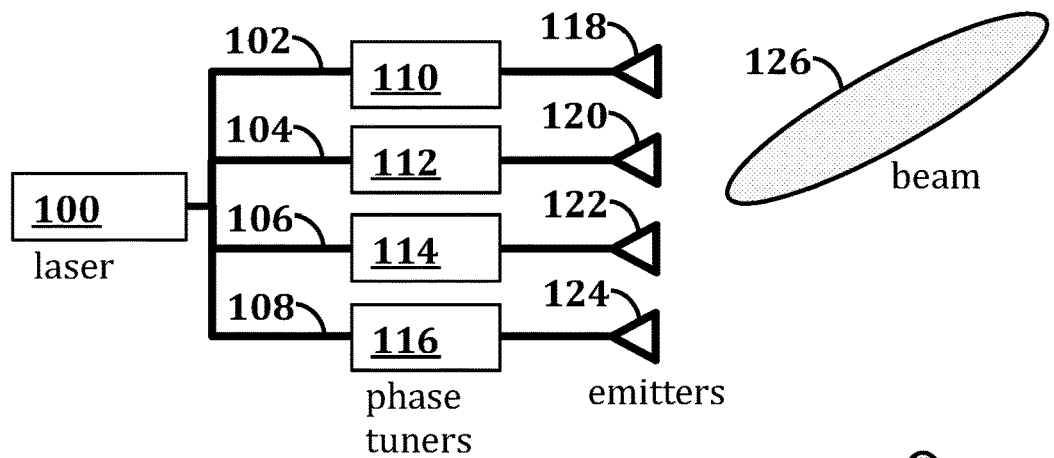
FIG. 1A is a schematic diagram of a simple four-element 1D optical phased array using conventional phase shifting elements for each row.
Figure 1B:
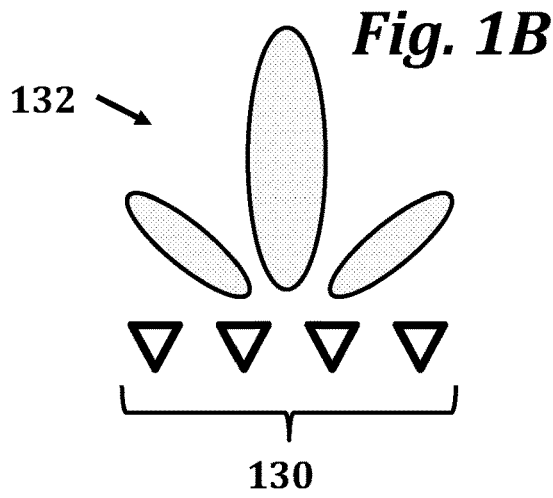
FIG. 1B and FIG. 1C illustrate beam lobe patterns generated by 1D optical phased arrays having different antenna spacing.
Figure 1C:
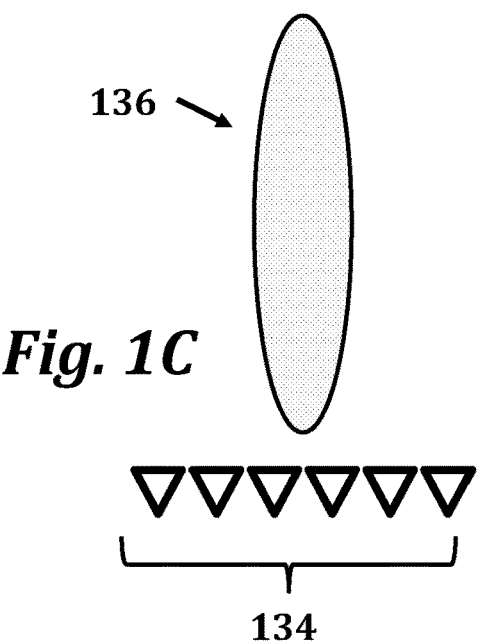
Figure 1D:
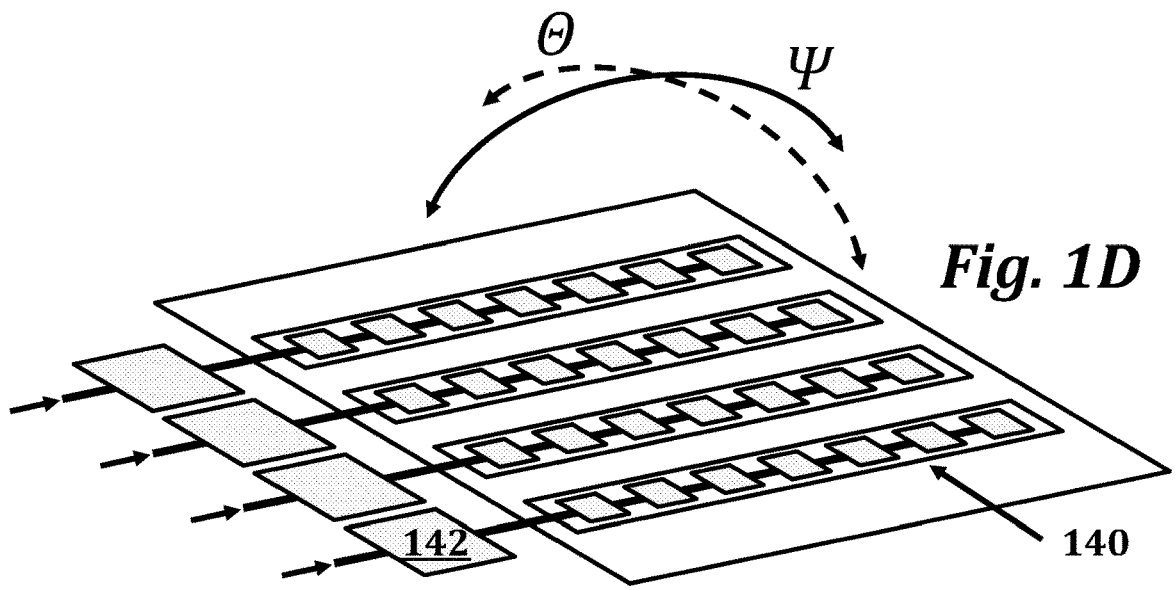
FIG. 1D shows a 2D dispersion engineered OPA made of multiple 1D phased arrays each with a conventional phase shifting modulator, where wavelength-based steering is used in the longitudinal direction.
Figure 1E:
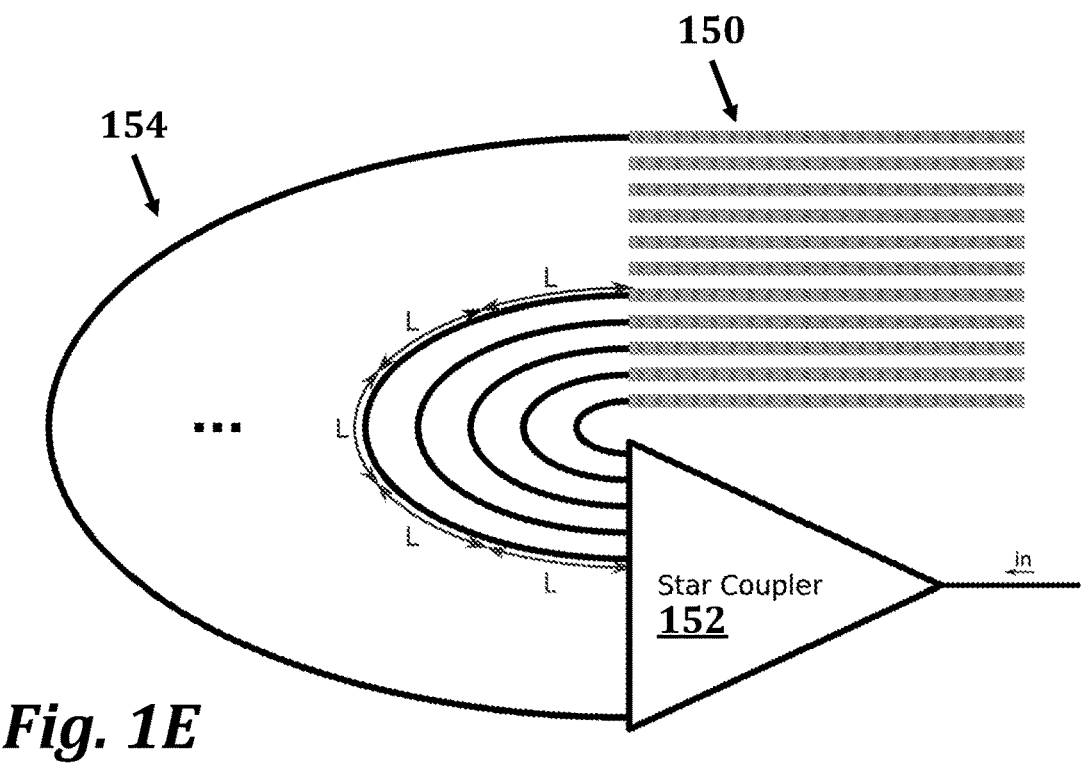
FIG. 1E shows a 2D OPA architecture that uses wavelength based 2D steering, where a star coupler and progressively longer waveguides are used to implement delays between the rows of the array.
Figure 1F:
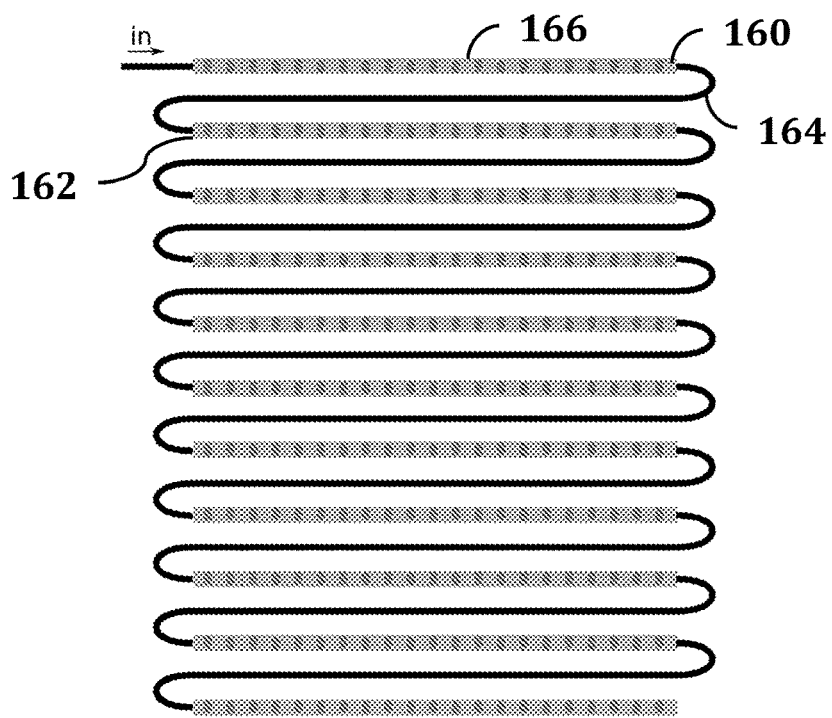
FIG. 1F shows a serpentine 2D OPA architecture that uses non-radiating waveguides between radiating waveguides to implement delays between the rows of the array.

In prior serpentine OPA designs (e.g., FIG. 1F), because only one type of radiating waveguide is used, the device is designed with non-radiating return waveguides so that light radiates only when propagating in one direction. If light were passed through the same type of waveguide in different directions, wavelength-based steering would not work, because the light in alternating waveguides would be steered in opposite directions. In the present OPA design, in contrast, the inventors have discovered that light travelling in both directions can be steered uniformly by using specially designed waveguides of two different types.

Figure 3A:
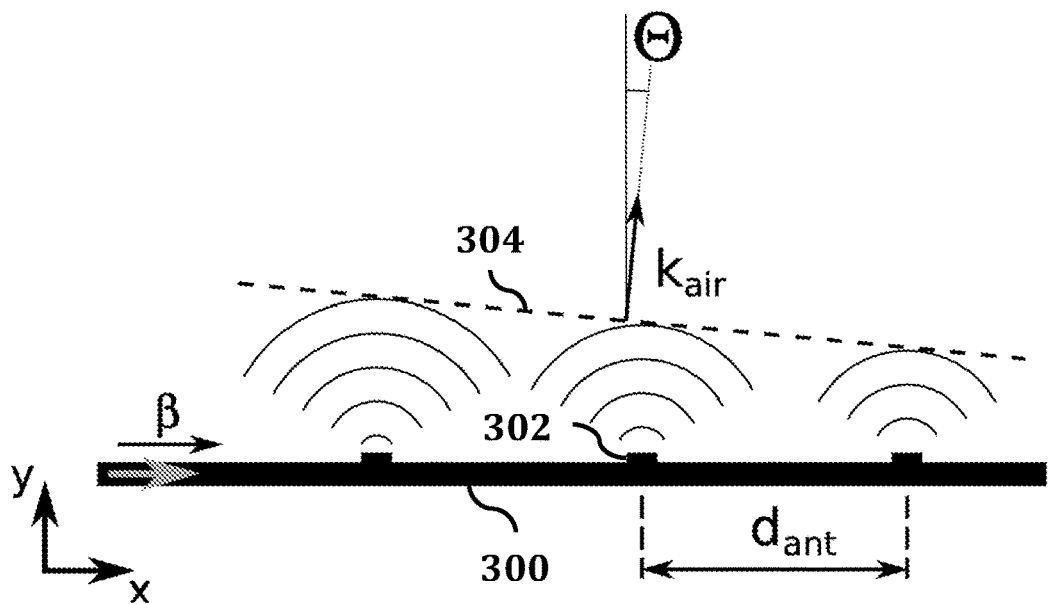
FIG. 3A shows a schematic side view of a dispersion engineered waveguide, according to one embodiment of the invention.
Figure 3B:
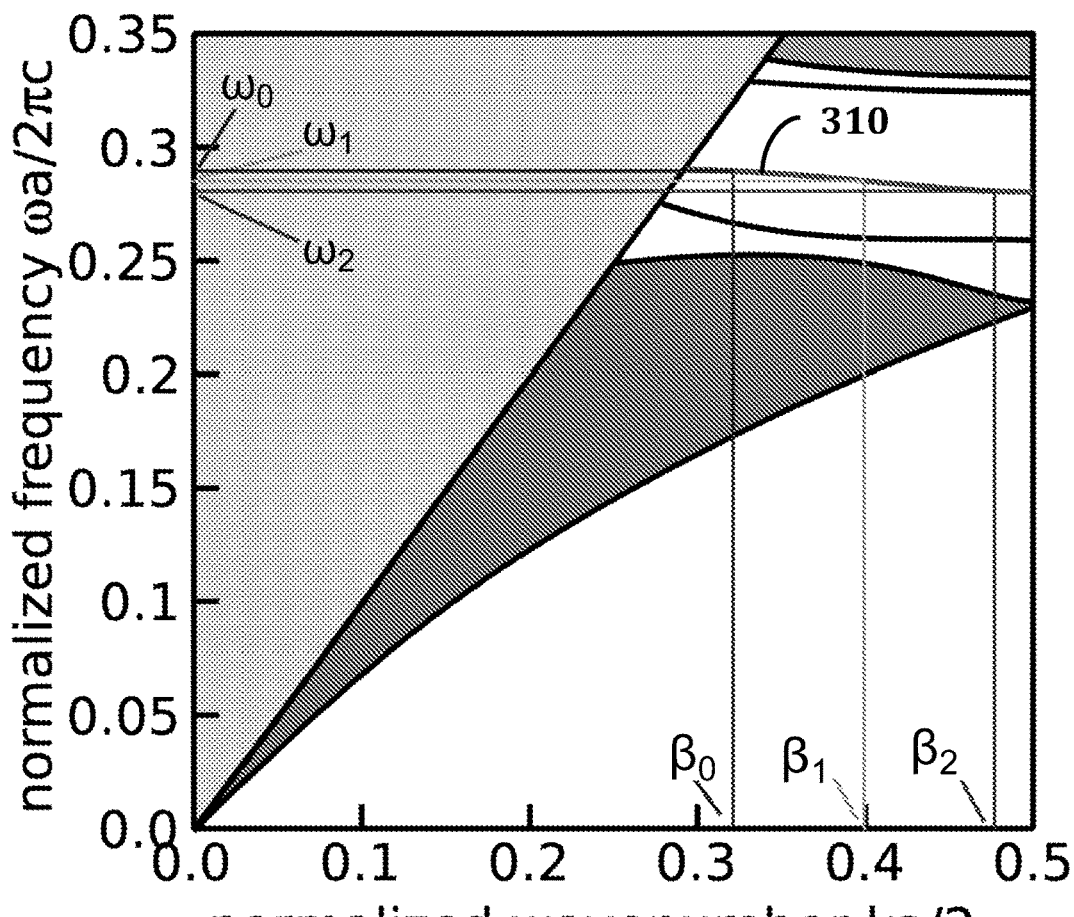
FIG. 3B is a graph showing the relation between the frequency and a waveguide's wavevector, i.e., the dispersion relation, according to one embodiment of the invention.

For wavelength-based longitudinal steering in OPA designs according to embodiments of the present invention, the dispersion relation of the dispersion-engineered slow light waveguides are used to steer the beam angle. FIG. 3A shows a schematic side view of such a waveguide 300. Light travels from left to right, as indicated by the waveguide's wavevector, $\beta$. At each antenna element 302, some light from the waveguide is emitted, resulting in a wavefront 304. The direction of this wavefront, indicated by the wavevector $k_{air}$, relates to the waveguide's wavevector $k_{ant}$ and the antenna spacing $d_{ant}=2\pi/k_{ant}$ by the grating relation:

$$\sin\Theta \cdot k_{air} = \beta + n \cdot k_{ant}, \quad (1)$$

where n is an integer. The relation between the frequency and the waveguide's wavevector, i.e., the dispersion relation, is depicted in FIG. 3B. The waveguide mode's dispersion curve 310 is very flat, which is characteristic for a slow light mode. Small changes in $\omega$ result in large changes in the wavenumber $\beta$. This causes the angle $\Theta$ to shift with the changing frequency $\omega$.

The OPA architecture advantageously is composed of a series of waveguides of two alternating types, even numbered waveguides and odd numbered waveguides. These two different waveguide types are designed such that they provide the same wavelength-based steering behavior even though light passes through them in opposite directions. This is accomplished using different dispersion relations for the two different types of waveguides. Specifically, both waveguide types are slow-light waveguide with the same group index, but with oppositely signed dispersion slopes, i.e., where the graph of the dispersion relation of one is substantially equal to the mirror image of that of the other. Taking into account the change in the magnitude of $k_{air}$ results in a small deviation of the mirror image being an exact mirror image. Deviations in the dispersion will result in phase errors. Large OPAs with a tight beam are very sensitive to phase errors in the beam profile. Errors will result in a lower beam quality. For smaller OPAs, for example, OPAs that are meant for use in short distances, the beam is less confined and the tolerance for phase errors is higher.

Figure 4:
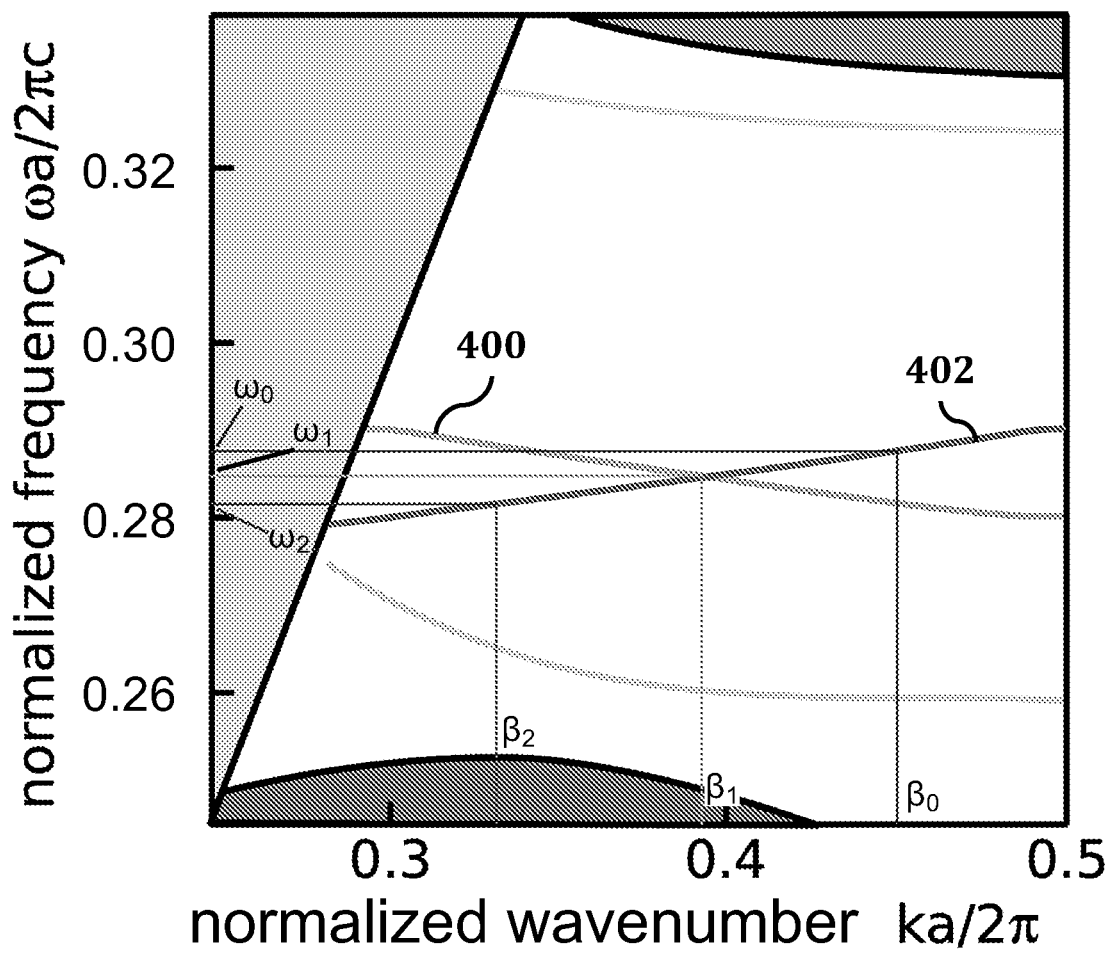
FIG. 4 is a close up of a graph showing the dispersion relation of waveguides of a first type and waveguides of a second type, according to one embodiment of the invention.

FIG. 4 shows a close up of a graph showing the dispersion relation of the waveguides of the first type 400 and waveguides of the second type 402. The opposing slope will cause the direction of the radiation emitted from the forward and back waveguides to move at the same pace. However, for the radiation of the two waveguide types to form one beam, the main radiation lobe also needs to line up. This can be accomplished by carefully choosing the antenna periodicity in the waveguides. Specifically, you want to have the k-vectors of the radiative lobes of the two waveguides to line up, such that $$\beta_1(\lambda) - n \cdot k_{ant1} = -\beta_2(\lambda) - m \cdot k_{ant2}$$

where $\beta_1$, $\beta_2$, $k_{ant1}$, $k_{ant2}$ are the wavenumbers and antenna wavenumbers for the two waveguide types, and n and m are integers.

Transverse Steering

Figure 5:
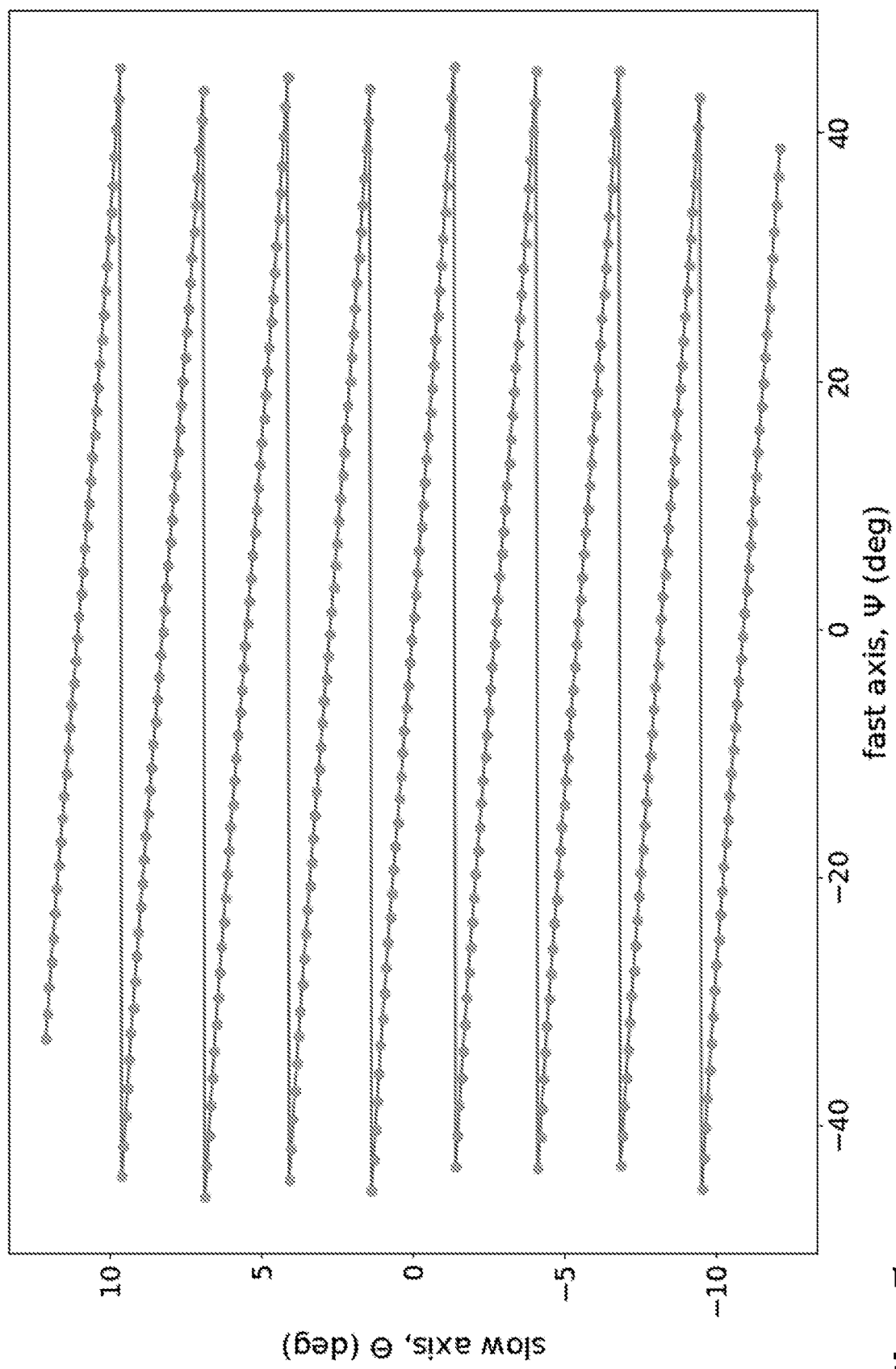
FIG. 5 illustrates a zig-zag raster scanning pattern generated by an OPA used to steer slowly in the longitudinal axis and very fast in the transverse direction, according to one embodiment of the invention.

Transverse steering ($\psi$) of the beam from the OPA is accomplished by designing the OPA to have a phase delay (e.g., 210, FIG. 2) between the central phased array sections of adjacent waveguides. This phase delay can be increased by making the slow-light delay sections (e.g., 210) longer. The angle in the transverse direction can be derived by the accumulated phase caused by passing through the delay element:

$$k_{air} \cdot d_{wg} \cdot \sin\psi + n \cdot 2 \cdot \pi = \beta_1 \cdot l_{delay} + \beta_2 \cdot l_{delay} + \Delta\phi_{bend}, \quad (2)$$

where $d_{wg}$ is the spacing between the waveguides, n is an integer, $l_{delay}$ is the length of the delay line, and $\Delta\phi_{bend}$ is the added phase of the bend element. From Equation 2, we can see that by having a large delay section, the scanning speed as a function of frequency can be increased. Therefore, the beam can be steered very fast in the transverse direction. For example, the OPA may be used to steer slowly in the longitudinal axis and very fast in the transverse direction, resulting in a zig-zag raster scanning pattern, as shown in FIG. 5, where horizontal axis shows the beam scanning angle in the fast, transverse direction, and the vertical axis shows the beam scanning angle in the slow, longitudinal direction.

Figure 6A:
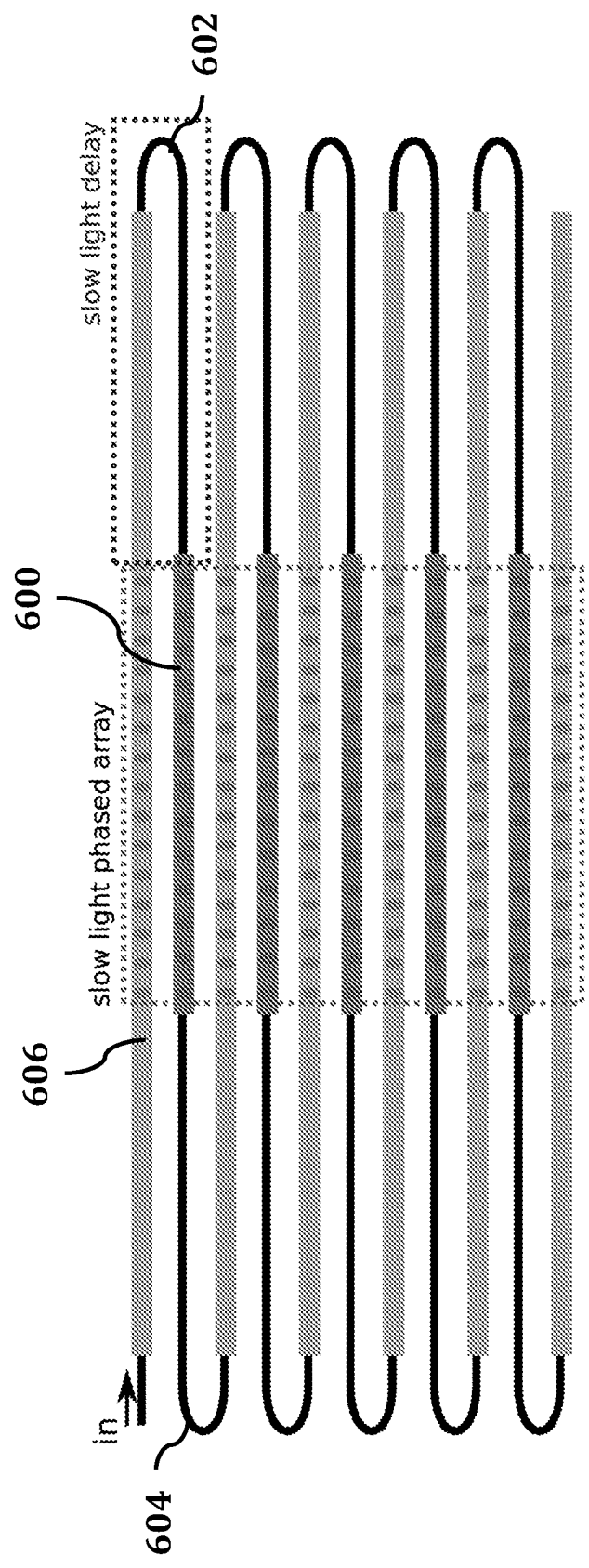
FIGS. 6A-B show two alternative embodiments based on the same principles of FIG. 2, illustrating alternatives for realizing slow light delays between phased array sections of waveguides of an OPA, according to embodiments of the invention.
Figure 6B:
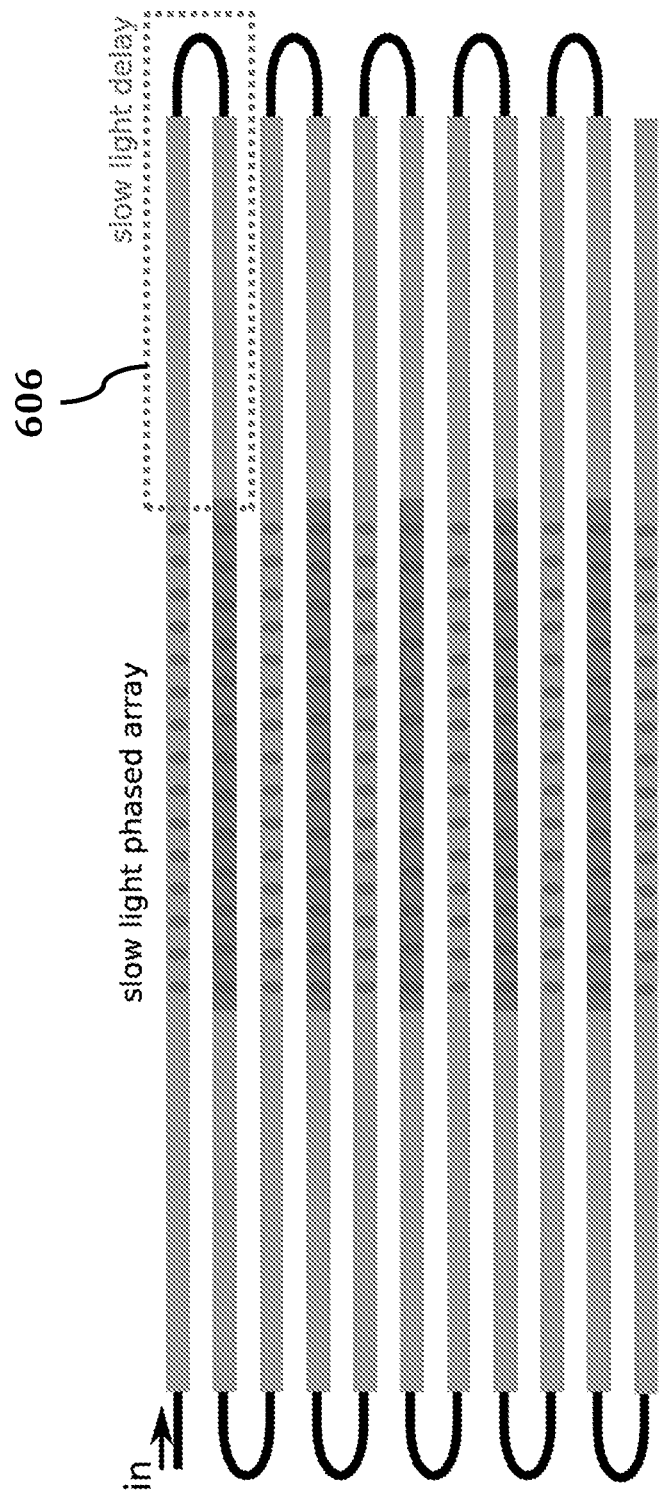

FIGS. 6A-B show two alternative embodiments based on the same principles shown in the embodiment of FIG. 2. The common features of these embodiments is that the middle slow light phased array sections of the waveguides have opposite dispersion slopes, while the phase delay sections on the right and left of the phased array sections do not necessarily share this feature. It suffices that they provide phase delays, and opposite dispersion slopes are not necessary for these right and left sections. FIG. 6A shows and embodiment that is identical to that of FIG. 2 except that the second waveguide type 600 (i.e., even numbered waveguides) has only a middle phased array waveguide section, which couples directly to the waveguide bends 602, 604 without any slow light delay sections to the right or left of the middle phased array section. The first waveguide type 606 (i.e., odd numbered waveguides) is identical to that of FIG. 2 and has slow light delay sections to the right and left of the phased array section to provide delay between rows of the slow light phased array. Another alternative embodiment would be to provide a slow light delay section to the right of the middle slow light phased array section of the second waveguide type, but not to the left, or vice versa; or to have a partial slow light delay section to the right or to the left, or both. Yet another embodiment would be like that of FIG. 6A except that the first waveguide type has some or all of its slow light delay sections replaced by waveguide bends instead of the second waveguide type. Alternatively, both waveguide types could have some or all of their slow light delay sections replaced by waveguide bends, provided there is at least some waveguide delay section between adjacent phased array section, and that the delay is the same between all phased arrays sections of the OPA.

As illustrated in FIG. 6B, the slow light delay waveguide sections 610 in the waveguides of first and second types could have the same dispersion slopes. It suffices that the first and second waveguide types have opposite dispersion slopes in the slow light phased array sections. More generally, the dispersion slopes of the slow light delay sections need not have opposite dispersion slopes. In summary, it suffices to have slow light delay waveguide sections between adjacent phased array sections of the OPA, where the delay between any two adjacent phased array waveguides in the OPA is the same.

FIG. 7 shows a dispersion-engineered design of a serpentine 2D OPA with six waveguides including six phased array sections 700, 702, 704, 706, 708, 710. The phased array sections are coupled on both ends to sets of waveguide delays 712 and 714. Waveguides, each including a phased array section and two delays, are connected by sets of waveguide bends 716 and 718. This small OPA is shown for purposes of illustration. For typical commercial applications the OPA would be larger, i.e., have longer waveguides and a larger number of waveguides. The first and second waveguide types have different dispersion-engineered structures to implement their opposite dispersion slopes. Techniques of inverse design can be used to design such dispersion engineered waveguides with positive and negative slope.

The structure could be made starting from an SOI wafer. The structure would be patterned by lithographically, i.e., e-beam lithography in lab situation or optical lithography in industrial. After etching silicon the device could be undercut by a box etch or covered with oxide, to create a homogeneous optical environment around the structure. The structure in the presentation was made assuming we would have an undercut structure.

The device could be used in a LIDAR application to scan a light beam in 2D by only changing the laser wavelength. Another application would be for free space communication. By varying the wavelength one can scan the beam and target a receiver. With knowledge of the wavelength that points the beam to the receiving device one can modulate the laser and send data.

The invention claimed is:

1. A dispersion-engineered 2D optical phased array device comprising:
    optical slow light waveguides arranged parallel to each other;
    waveguide bends optically coupling ends of adjacent waveguides of the optical slow light waveguides to form a serpentine optical configuration;
    wherein the optical slow light waveguides comprise first waveguides of a first waveguide type and second waveguides of a second waveguide type, wherein the first waveguides and the second waveguides are arranged adjacent to each other and alternate with each other;
    wherein the optical slow light waveguides comprise phased array sections, wherein first phased array sections of the first waveguides and second phased array sections of the second waveguides have dispersion slopes of opposite sign and the same group index;
    wherein the optical slow light waveguides comprise slow light delay waveguide sections that provide a delay between adjacent waveguides.

2. The dispersion-engineered 2D optical phased array device of claim 1 wherein the first waveguides of the first waveguide type comprise the slow light delay waveguide sections, and wherein the second waveguides of the second waveguide type comprise middle phased array waveguide sections that couple directly to waveguide bends.

3. The dispersion-engineered 2D optical phased array device of claim 1 wherein the second waveguides of the second waveguide type comprise the slow light delay waveguide sections, and wherein the first waveguides of the first waveguide type comprise middle phased array waveguide sections that couple directly to waveguide bends.

4. The dispersion-engineered 2D optical phased array device of claim 1 wherein the first waveguides of the first waveguide type and the second waveguides of the second waveguide type comprise the slow light delay waveguide sections.

5. The dispersion-engineered 2D optical phased array device of claim 1 wherein the slow light delay waveguide sections and the first phase array sections have equal dispersion slopes.

6. The dispersion-engineered 2D optical phased array device of claim 1 wherein the slow light delay waveguide sections and the second phase array sections have equal dispersion slopes.

7. The dispersion-engineered 2D optical phased array device of claim 1 wherein slow light delay waveguide sections of the first waveguides have dispersion slopes equal to dispersion slopes of the first phase array sections.

8. The dispersion-engineered 2D optical phased array device of claim 1 wherein slow light delay waveguide sections of the second waveguides have dispersion slopes equal to dispersion slopes of the second phase array sections.

9. The dispersion-engineered 2D optical phased array device of claim 1 wherein slow light delay waveguide sections provide equal phase delays between phased array sections of adjacent phased array sections.

* * * * *